Dec. 17, 1968   F. E. MURPHY, JR   3,417,330
ELECTRICAL CIRCUIT FOR DETERMINING THE RESISTANCE
AND TEMPERATURE OF A RESISTIVE ELEMENT
Filed Dec. 21, 1965
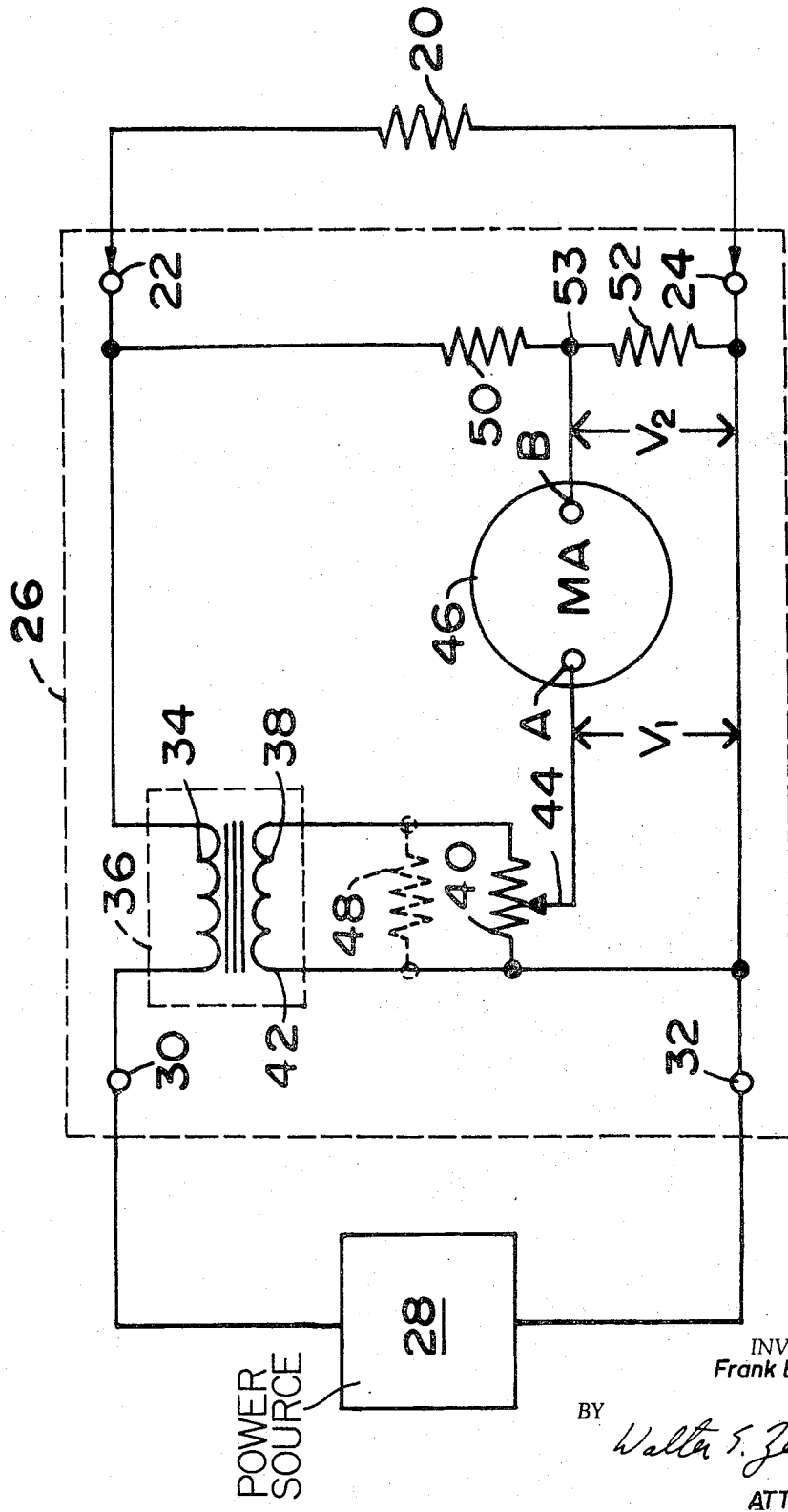
INVENTOR.
Frank E. Murphy, Jr.
BY *Walter S. Zebrowski*
ATTORNEY United States Patent Office 3,417,330
Patented Dec. 17, 1968

3,417,330
ELECTRICAL CIRCUIT FOR DETERMINING THE RESISTANCE AND TEMPERATURE OF A RESISTIVE ELEMENT
Frank E. Murphy, Jr., Corning, N.Y., assignor to Corning Glass Works, Corning, N.Y., a corporation of New York
Filed Dec. 21, 1965, Ser. No. 515,423
6 Claims. (Cl. 324—62)

ABSTRACT OF THE DISCLOSURE

An electrical circuit having a pair of input terminals and a pair of output terminals wherein one input and output terminal are commonly connected and the primary winding of an instrument transformer is connected between the other input and output terminals. An adjustable resistance element is connected across the secondary of the transformer with its adjustable tap connected to one terminal of a current indicating device. The other terminal of the current indicating device is connected to the common connection between a pair of resistors serving as a voltage dividing network. The network is connected between the output terminals of the circuit. As the temperature of a resistive element being measured changes the current drawn by the element changes thus unbalancing the voltage drops between the terminals of the current indicating device in proportion to the change of resistance and temperature of the element.

---

Resistance heating elements are used in a variety of industrial processes for supplying heat to materials which must be raised to elevated temperatures, often melting temperatures, and sometimes held at such temperatures for considerable periods of time. Noble metal elements such as platinum and alloys thereof have found particular favor, despite their high cost, in processes which require precise control at extremely high temperatures. Platinum and platinum alloy heating elements provide reliability, reproducibility, chemical inertness, high electrical and thermal conductivity and other desirable attributes. Because of their high cost, ordinary problems of heating element life, replacement, and the like are greatly magnified when platinum or its alloys are used.

All heating elements at one time or another are operated close to their burn out temperatures, sometimes exceeding them. Such operation is usually inadvertent, through poor controller response, temperature sensing and measuring errors caused by thermal lag, slow heating element response, and the like. Whether operation of a heating element at or above the burn out temperature is intentional or not, a usual result is premature failure of the element. Long element life is greatly desired, but not often achieved, because of an inability to accurately determine the temperature of a powered heating element.

Many materials which must undergo thermal processing are extremely poor thermal conductors, and are slow to respond to external changes. Thus, a temperature sensor can easily cause heat to be provided when none are needed. A small separation between a heating element and a temperature sensor can introduce large thermal lag errors.

Usually heating elements, particularly immersion heaters, have protective sheathings or coatings to protect them from corrosive materials and exposure to other deleterious agents and effects. Such sheathings have excellent insulating properties and can cause large errors between the temperature of a wire heating element and the temperature of a material being heated.

The temperature of a resistance heating element can be determined from its electrical resistance, provided that its resistance can be measured. If the resistance of such an element at a specific temperature, and the temperature coefficient of resistance of the element's material are known, then one may calculate an unknown temperature by merely determining the new resistance. Unfortunately, it is not usually possible to measure the resistance of an operating heating element because during operation, current and voltage are being supplied to that element, and ordinary resistance measuring techniques are not useable. Such is the case with an ohmmeter, for example, wherein determination of an unknown resistance depends upon supplying a known and constant voltage to an inert and usually cold resistance element, utilizing measured current flow therein to complete a simple Ohm's law calculation. In contrast, an operating heating element is usually inaccessible during operation, and may be immersed in an environment having a temperature of several hundred degrees or more.

Although it is possible to measure voltage and current in the primary circuit, and calculate an element resistance by Ohm's law, such a technique is time-consuming, and inaccurate. The task of quickly and accurately determining the resistance of an active resistance element under the above, briefly described, conditions has heretofore been impossible, and therefore the determination of temperature of such an element has likewise been impossible.

Accordingly, it is an object of the present invention to provide a means for quickly and accurately determining the resistance of a heating element placed in an ordinarily inaccessible location.

Another object of the present invention is to provide a means for determining the operating temperature of such an element at any desired instant, so that the element may be operated within safe limits of temperature.

Still another object of the present invention is to provide a means for prolonging the operating life of a resistance heating element.

A further object of the present invention is to provide a means for measuring the temperature of any conductive material.

A still further object of the present invention is to provide a means for determining the temperature of a heating element when powered by variable voltages and alternating currents.

An additional object of the present invention is to provide a temperature control device having adjustable limits.

The present invention is an electrical circuit comprising a pair of input terminals and a pair of output terminals wherein one input terminal is connected to one output terminal. The primary winding of a current transformer is connected between the other input and output terminals. The secondary winding of said transformer has one end connected to said one input terminal. An adjustable resistance element, having a wiper arm, is connected across said secondary winding. The wiper arm, is connected to one terminal of a current indicating device. Another terminal of said device is connected to the junction of two series resistance elements which are connected across said output terminals.

The drawing is a schematic diagram of an electrical circuit according to the present invention.

Referring to the drawing, resistance element 20, having a resistance to be determined, is shown connected across output terminals 22 and 24 of circuit 26. Resistance element 20 may be an electrical heating element, a resistor or the like, and may be made from any of a number of suitable materials having a temperature coefficient of resistance other than zero. If output terminals 22 and 24 are electrodes, for example, then a liquid or powdered resistance element may be used. Ordinarily, resistance element 20 is constructed in the form of a wire coil from platinum, platinum alloys, tungsten and like materials.

When power source 28 is connected across input terminals 30 and 32, current flows in circuit 26 and through element 20 which is heated thereby, causing its resistance to change. The same current flows through primary winding 34 of current transformer 36, inducing a current in secondary winding 38 thereof. The secondary current flows through an adjustable resistance element, or potentiometer 40, connected across the secondary winding. One end 42 of the secondary winding is connected to input terminal 32 of the circuit. A voltage is generated across potentiometer 40 by the secondary current. A variable portion $V_1$ of the generated voltage may be applied by means of potentiometer wiper arm 44 to terminal A of current flow indicator 46.

Transformer 36 provides a constant ratio between primary and secondary current, independent of the primary voltage. Such a ratio may be 100 to 1 for example. By using a different transformer, a different ratio may be selected as needed or desired, depending upon the requirements of a particular circuit and its component values.

In one embodiment, for example, primary voltages may range from 20 to 70 volts while the current ratio provided by the transformer remains constant. In another embodiment, primary voltages may range from 200 to 400 volts, while again, the transformer provides a constant current ratio.

Although power source 28 is usually a controlled power supply having the capability of providing a wide variety of currents and voltages, it is also possible to use other voltage sources such as a standard 110 volt power line, for example.

In certain applications, the magnitude of current flowing in the heater circuit may be quite high, for example 100 amperes or more. In other circumstances, only a few amperes may be required. These factors of current and voltage will depend on the type of heating element employed, the material to be heated, the amount of power needed to heat such material in a given time, and similar considerations. It is important to note, however, that the circuit of the present invention may be suitably modified by selection of the appropriate component values to provide a means for measuring heating element resistance in a wide variety of applications.

Although the circuit illustrated comprises a transformer, implying A.C. operation, the circuit may also be used with a D.C. power supply by replacing the transformer with a resistor, called a shunt resistor. In this case, potentiometer 40 may be connected across the shunt resistor, deriving a voltage therefrom. In such a case, the current flow indicator could be a D.C. milliammeter, rather than an A.C. milliammeter as may be suitable for A.C. operation. Current flow indicator 46 may also be a current meter, an electric lamp, an electric alarm, a relay or the like.

For proper calibration of the circuit, it is necessary to know the heating element resistance for at least one temperature as well as its temperature coefficient of resistance. In some applications, resistance element 20 may take the form of a molten material such as metal, glass or the like, wherein direct resistance measurements may be made, and a temperature determined therefrom. Although in most applications a resistance heating element is used, it should be clearly pointed out that the present invention is in no way limited to the use of such an element.

Another use for the circuit lies in an embodiment wherein the temperature of a resistive material is held constant, and the current indicator is nulled. Whenever current flow is indicated, the resistance of the material has changed, indicating a change in its composition, for example. It is necessary, however, that whatever material is used for the resistance element, its temperature coefficient of resistance be known.

A fixed resistance 48, shown in phantom in the drawing may be placed in parallel with potentiometer 40 to provide a change in the range of adjustment thereof.

A voltage divider network, comprising series resistance elements 50 and 52, is connected across output terminals 22 and 24 of the circuit. Voltage tap 53 is connected to terminal B of indicator 46, providing voltage $V_2$. When $V_1$ and $V_2$ are equal, no current flows through indicator 46. For circuit calibration purposes it may be desired to make either resistor 50 or resistor 52 adjustable, providing a variable ratio therebetween. The provision for an adjustable voltage divider network simplifies circuit calibration and permits rapid change-over whenever the temperature of a new heating element is to be measured.

In operation, voltage drop $V_1$, provided by potentiometer 40, can be varied as desired, or necessary, to equal $V_2$ thereby preventing current flow through indicator 46. This is called nulling the indicator, and once a null is achieved, any departure from equality between $V_1$ and $V_2$, such as may be caused by a change in resistance of element 20, will cause current flow, indicated by indicator 46. Re-nulling the indicator by potentiometer adjustment provides a potentiometer resistance change which is proportional to the change in resistance and, in turn, to the temperature of element 20. In most applications the circuit will be calibrated in such a manner that the potentiometer dial reading will be numerically equivalent to the resistance in ohms of elements 20, when the indicator is nulled.

Although a milliammeter is shown in the circuit of the drawing, it should be understood that current flow through an impedance element, a relay coil, or an electronic switch, for example, may be used to control a power supply. In a typical example of such a use, a relay coil is substituted for the current indicator. Under these conditions the flow of current caused by $V_1$ and $V_2$ imbalance, actuates the relay to turn on the power. When the resistance element heats up and $V_1$ equals $V_2$, current flow ceases and the relay opens, shutting off the power again. In this manner, the circuit of the present invention may be used as a power controller to regulate the temperature of the heating element. It is obvious that any process temperature, hence load resistance, may be selected as a control limit. Most often, such a temperature is selected to be just below the burn out temperature of a heating element, and the present invention acts as a safety device, prolonging element life.

By way of example and without thereby limiting the scope of the present invention, there are given below design data for a resistance measuring circuit of the type shown in the drawing.

| Resistors: | Value and type |
|---|---|
| 20 | 25 ampere; 120 volt; platinum wound heating element. |
| 40 | 10K ohm, 10 turn adjustable potentiometer. |
| 48 | 100 ohms. |
| 50 | 18K ohms. |
| 52 | 2K ohms. |
| Transformer: | Type |
| 36 | Constant current. Primary-secondary ratio 100:1. |
| Current flow indicator: | |
| 46 | A.C. milliammeter, 0–500 ma. scale. |
| Power supply: | |
| A.C. | Controllable, 0–100 volts. |

The circuit in accordance with the example provides an accurate and quick means for determining the temperature of the heating element at all times during its operation. Through constant knowledge of heater element operating temperature as provided by the circuit, heating element life may be greatly prolonged and its operation optimized.

Although the present invention has been described with respect to specific details of certain embodiments thereof, it is not intended that such details be limitations upon the scope of the invention except insofar as set forth in the following claims.

I claim:
1. A relatively low voltage electrical circuit for determining the resistance of a resistive element comprising,
   a pair of input terminals and a pair of output terminals, said output terminals being adapted for connection across said resistive element, one input terminal being connected to one output terminal,
   a current transformer having a primary and a secondary winding, said primary winding connected intermediate the other input and output terminals, said secondary winding having one end connected to said one input terminal,
   an adjustable resistance element having a wiper arm, said element connected across said secondary winding,
   a means for indicating current flow having first and second terminals, said first terminal being connected to said wiper arm, and
   a voltage dividing network comprising two series connected resistance elements, said elements connected directly across said output terminals, and said second terminal of said means for indicating current flow connected intermediate said resistance elements.
2. The circuit of claim 1 further comprising an alternating current source connected across said input terminals.
3. The circuit of claim 1 wherein said means for indicating current flow is a current meter.
4. The circuit of claim 1 wherein a fixed resistance element is connected in parallel with said adjustable resistance element.
5. The circuit of claim 1 wherein said output terminals are electrodes.
6. A relatively low voltage electrical circuit for determining the resistance of a resistive element comprising,
   a pair of input terminals and a pair of output terminals, said output terminals being adapted for connection across said resistive element, one input terminal being connected to one output terminal,
   a shunt resistor connected intermediate the other input and output terminals,
   an adjustable resistance element having a wiper arm, said element connected across said shunt resistor,
   a means for indicating current flow having first and second terminals, said first terminal being connected to said wiper arm,
   a voltage dividing network comprising two series connected resistance elements, said elements connected directly across said output terminals, and said second terminal of said means for indicating current flow connected intermediate said resistance elements, and
   a direct current power source connected across said input terminals.

References Cited

UNITED STATES PATENTS

| 2,170,813 | 8/1939 | Doble et al. | 324—54 |
| 2,659,234 | 11/1953 | Harrison | 324—65 XR |

RUDOLPH V. ROLINEC, *Primary Examiner.*

E. E. KUBASIEWICZ, *Assistant Examiner.*